United States Patent [19]

Bittner

[11] 3,977,201

[45] Aug. 31, 1976

[54] METHOD AND APPARATUS FOR PREVENTING BUCKLING OF PIPELINE AS IT IS BEING ASSEMBLED AND LAID ON THE OCEAN FLOOR

[76] Inventor: Robert B. Bittner, 4341 SW. Woodside, Lake Oswego, Oreg. 97034

[22] Filed: Mar. 19, 1975

[21] Appl. No.: 559,900

[52] U.S. Cl. ................................. 61/112; 29/429
[51] Int. Cl.$^2$ ........................................ F16L 1/00
[58] Field of Search ............. 61/72.3, 72.1; 138/93; 29/429

[56] References Cited
UNITED STATES PATENTS

| 2,600,761 | 6/1952 | Halliburton | 61/46.5 |
| 3,753,091 | 8/1973 | Daspit | 61/72.3 X |
| 3,890,693 | 6/1975 | Eagleton et al. | 61/72.3 X |

Primary Examiner—Jacob Shapiro
Attorney, Agent, or Firm—Wells, St. John & Roberts

[57] ABSTRACT

A method and apparatus operable to produce a continuous tension along at least a prescribed portion of pipeline as it is being assembled along the ocean surface and lowered to the ocean floor. The disclosed method involves the basic steps of: assembling an elongated pipeline above or adjacent to the ocean surface; placing at least a portion of the assembled pipeline under internal gas pressure to create a longitudinal tension along that portion of sufficient magnitude to prevent buckling as it is lowered to the ocean floor; and lowering the assembled pipeline onto the ocean floor. A portion of the lower section is filled with liquid to provide a gas tight seal and to prevent lateral movement of the lowered pipeline. The apparatus is comprised of a pair of inflatable bladders connected at opposite ends of a telescoping ram cylinder. This assembly is inserted into the assembled pipeline interior and is connected by a pressure tube and control lines to a barge where the pipeline is progressively assembled. Pressurized air is directed under controlled conditions to the bladders and cylinder so a constant airtight seal is maintained at a desired location in the assembled pipeline by an "inch worm" progression involving the steps of: inflating a first bladder against the pipeline interior; deflating the second bladder; extending the cylinder to move the deflated second bladder in a preferred direction; inflating the second bladder against the pipeline interior; pressurizing the area between the inflated bladders; deflating the first bladder; retracting the cylinder to move the deflated first bladder toward the inflated second bladder; re-inflating the first bladder; and again deflating the second bladder.

9 Claims, 10 Drawing Figures

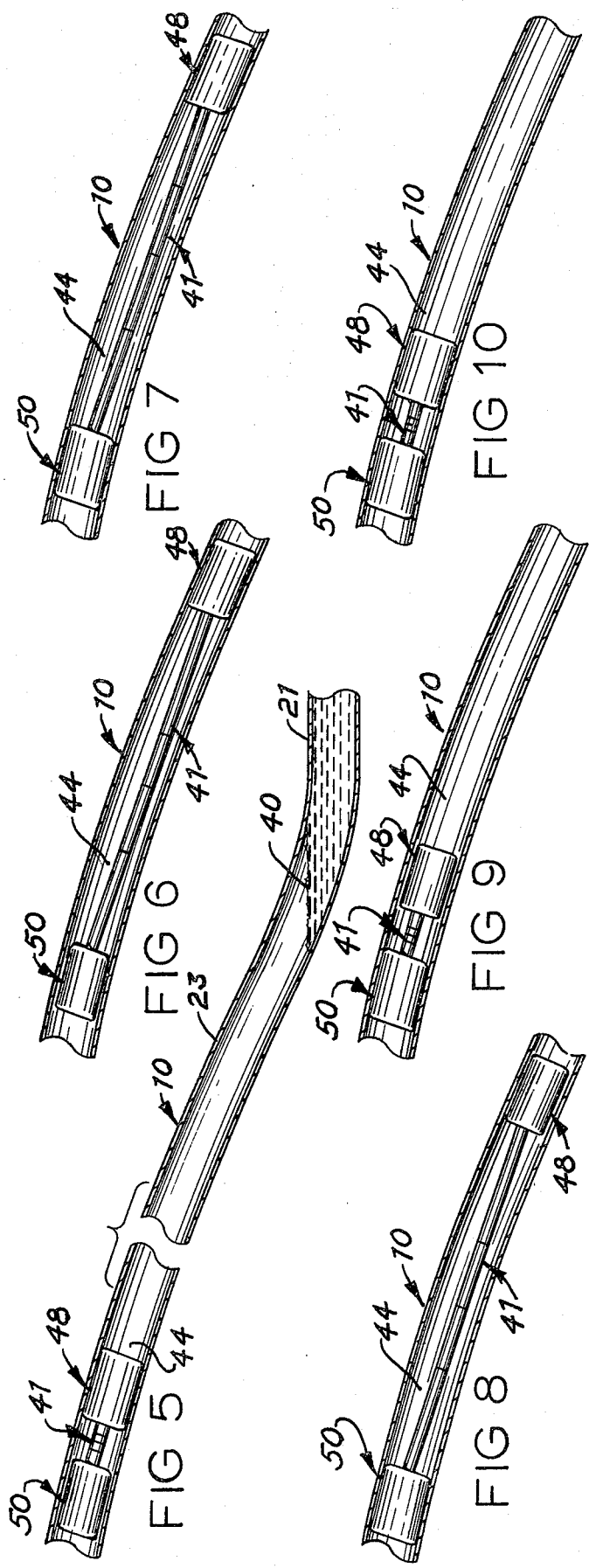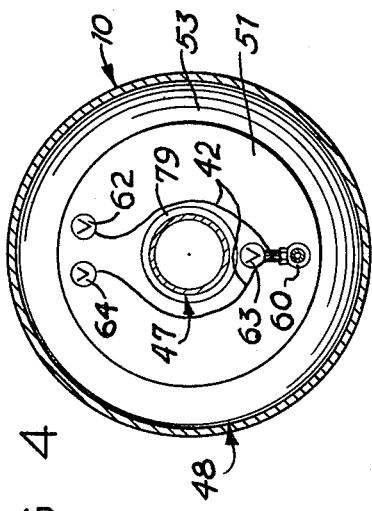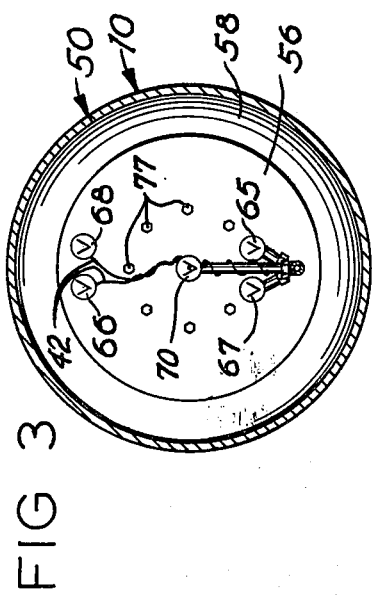

METHOD AND APPARATUS FOR PREVENTING BUCKLING OF PIPELINE AS IT IS BEING ASSEMBLED AND LAID ON THE OCEAN FLOOR

BACKGROUND OF THE INVENTION

The present invention is related to methods and apparatus for laying pipeline along the ocean floor and more particularly to such methods and apparatus for preventing buckling in large diameter thin walled pipeline that is assembled along the ocean surface and sequentially lowered to the ocean floor.

Utilization of underwater pipeline is becoming more prevelant with the advent of offshore oil and natural gas drilling. Oil or natural gas received from such drilling operations is usually either pumped into a tanker ship or piped under water along the ocean floor to a mainland refining facility. The pipeline utilized in the latter operation is often rather large in diameter, one example being a pipe of two feet inside diameter with a wall thickness of ⅝ inch.

It has proven to be an extremely difficult and expensive procedure to assemble and locate such a pipeline between an offshore facility and a distant facility whether it be an on shore refining facility or another offshore facility. The common procedure utilized is to obtain the pipeline in sections of equal length and connect them end to end to form the desired length. This procedure is accomplished on a specially designed barge that includes facilities for welding the pipe ends together and feeding the assembled lengths out as the barge moves from one location to another. Means is provided on such barges for applying a high tension to the pipe being fed out and lowered onto the ocean floor. Tension is maintained primarily to prevent buckling of the portion of pipeline extending from the barge to the ocean floor. The tensioning apparatus utilized ordinarily places from between 35,000 to 100,000 lbs. tension on the pipeline depending on water depth and pipe weight.

At the beginning of the operation, the beginning pipeline end is held stationary above the surface of the water or slightly below and the barge is moved away from that end as sections are added to the remaining end. Once a sufficient amount of pipeline has been assembled, the first (beginning) end is lowered to the ocean floor. A tug boat or other means maintains a constant tension on the section of pipeline extending between there and the barge until enough pipe has been lowered to the ocean floor to resist the tension without moving. Preferably, the length of pipeline laid on the ocean floor is sufficient alone to prevent the barge from pulling the first pipeline end along the ocean floor as it applies the required tension to prevent buckling. It may therefore be understood that a very significant length of pipeline must be fed out before it may be lowered to the ocean floor or additional means must be provided to prevent the first pipe end from being pulled along with the barge. The distance required if the pipeline length is held adjacent the ocean surface is often such that the pipeline cannot be maintained in sufficient tension to prevent it from swaying at the center and buckling as the pipe is initially being formed.

It is not infrequent that after the pipeline laying operation is well underway, the unsupported pipeline portion extending between the ocean surface and ocean floor buckles due to swells that cause the barge to change elevation relative to the ocean floor. The tension apparatus mounted to the barge is not capable of maintaining a continuous tension on the pipeline under such conditions and must therefore be set to apply a maximum amount of tension at the highest elevation the barge reaches in order to maintain a minimum amount of tension at the lowest barge elevation. Too often, the maximum amount of tension capable of being produced on the barge is insufficient to maintain the unsupported portion of pipeline under constant tension. The result is that frequently the pipeline buckles along the unsupported portion extending between the ocean floor and barge. Once the pipe buckles, a very tedious and extremely expensive procedure must then be followed to again take up that section of pipeline previously assembled and lowered in order to remove the buckled section and replace it with a new undamaged section.

An additional disadvantage of the tensioning process described above is that, in order to increase tension, an equal or greater pulling force must be provided by the barge to enable forward movement of the barge while maintaining such pipeline tension. This force is applied through means of a plurality of extremely heavy anchors. Ordinarily, approximately eight anchors are utilized to secure the barge against undesired movement and to enable the barge to pull itself along the ocean floor rather than being propelled by other means. The method utilized for propelling the barge is accomplished by one or two tug boats that lift and move anchors forwardly to distant locations while other anchors are being pulled inward by winch means on the barge. Obviously, if additional tension is to be placed on the pipeline, the anchor weight must be increased or the anchors be more efficiently and securely engaged with the ocean floor. Obviously, this again constitutes a tedious and expensive portion of the operating costs.

It is a primary objective of the present invention to provide a method and apparatus that will constantly tension the unsupported portion of pipeline extending between the ocean floor and ocean surface, independently of sea conditions and barge movement whether horizontal or vertical.

A further objective is to provide such a method and apparatus that will allow progressive flooding of that section of pipeline on the ocean floor.

A further objective is to provide a method and apparatus that will constantly tension the unsupported portion of the pipeline independently of tension on the forward barge anchors.

A yet further object is to provide such a method and apparatus that is significantly less expensive to operate, maintain and purchase, than any previously known method or apparatus.

An additional object is to provide such a method and apparatus wherein the capacity for tension is inherently increased geometrically as the pipeline radius increases.

An additional objective is to provide a method and apparatus to internally pressurize the submerged pipe in order to counteract the external hydraulic pressure created by increasing water depth.

These and yet further objects and distinct advantages will become apparent upon reading the following description which, taken with the accompanying drawings, describe a preferred form of my invention. It should be noted that the description and drawings are exemplary of a single embodiment of my invention and are not intended to restrict the scope of my invention as defined in the appended claims.

BRIEF DESCRIPTION OF THE DRAWINGS

A preferred form of the present invention is illustrated in the accompanying drawings in which:

FIG. 3 is a section view taken along line 3—3 in FIG. 2;

FIG. 4 is a section view taken along line 4—4 in FIG. 2;

FIGS. 5 through 10 are schematic diagrams illustrating operation of my invention.

DETAILED DESCRIPTION OF A PREFERRED EMBODIMENT

Figure 1:
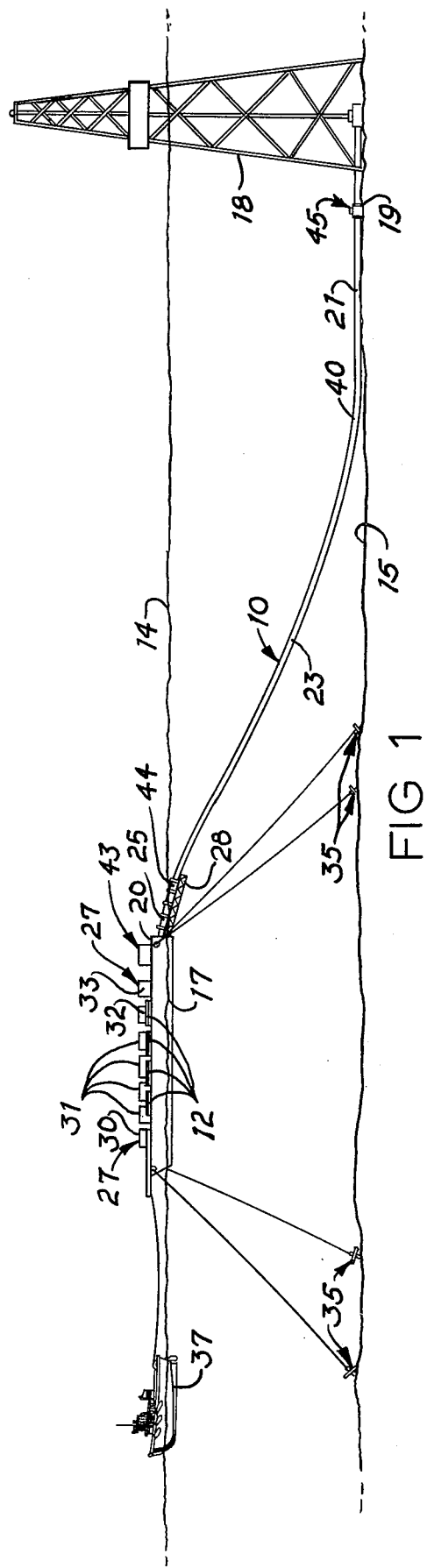
FIG. 1 is a schematic pictorial diagram of a pipe laying barge in operation utilizing the method and apparatus of the present invention.

Before entering into a detailed description of the apparatus of my invention, reference will be first made to FIG. 1 in order to achieve a basic understanding of the apparatus and methods utilized to lay pipeline along the ocean floor between two distant locations.

A pipeline, indicated by the reference character 10, is shown in FIG. 1 extending from ocean surface 14 to ocean floor 15. Pipeline 10 is comprised of a number of individual sections 12 that are connected end to end on a specially designed barge 17. As may be noted, the pipeline 10 is formed on the barge and is successively lowered to the ocean floor as new sections are being added on the barge. Initially, however, in order to begin the pipe laying operation, the beginning end 19 (shown resting on the ocean floor 15) is held adjacent the ocean surface 14 by a tug boat or other means. While end 19 is being held, the barge is moved toward a distant location or in a direction away from the pipe end 19 as additional pipe sections 12 are added to the remaining end 20. Once a sufficient assembled length has been played out from the barge 17, the end 19 is lowered onto ocean floor 15. This procedure assures that the pipe end 19 is positioned at a specific location on the ocean floor, usually adjacent to an off-shore drilling rig 18. In the lowered condition (as shown in FIG. 1) the pipeline length may be referred to as including several portions with a first portion being that located and resting on the ocean floor. This portion is indicated by reference numeral 21. An unsupported portion 23 extends upwardly from portion 21 to ocean surface 14. The portion of pipeline 10 extending above the ocean surface is indicated by reference numeral 25. It is the unsupported portion 23 extending substantially from the ocean surface to the ocean floor that is of primary concern in pipe laying operations since it is that portion that most frequently buckles during the forming and laying operation. It is therefore also the area of primary concern of the present invention.

Looking at barge 17 in greater detail, FIG. 1 schematically shows a stinger 28 or auxiliary rearward support for the pipeline extending between portions 25 and 23. Previously, additional stingers were utilized in order to provide as much support as possible for the pipeline extending along portion 23 toward the ocean floor. Ordinarily, a separate control room is utilized to control elevation of the stinger(s) 28 in relation to the barge. I find through utilization of the present invention that at most, one rather short stinger may be utilized to provide initial support for the pipeline from the barge to a position slightly below the ocean surface.

Along the barge 17 are a plurality of operational stations 27 at which successive pipe lengths 12 are added to the pipe end 20 in order to progressively add to the pipeline length as the barge is moved along. The first station, indicated at 30, is a line up station whereat the pipe segments 12 are each aligned with the remainder of the formed pipeline so it may be joined coaxially to the pipeline. Several weld stations 31 are provided to enable the joints between aligned sections 12 to be progressively welded as they move toward the aft end of barge 17. An x-ray station 32 is also provided to inspect the welds at the several weld stations 31. Before the welded sections are fed into the ocean, they are coated with a bituminous compound at station 33 to prevent corrosion.

The barge 17 is moved in a preferred direction by provision of a plurality of anchor assemblies 35. Normally eight such assemblies are utilized with two extending from each corner of the barge. One or two tug boats 37 are utilized to move anchors ahead of the barge as it moves along retreiving the anchor cables. Through this procedure, the barge may move steadily at its own pace along the ocean surface in a rather precise path.

From the above general description, a more thorough understanding of the method and apparatus utilized with the present invention may now be had. Generally speaking, the present method includes the basic steps of: (1) forming the pipeline adjacent the water surface; (2) lowering the pipeline to the ocean floor; (3) pressurizing the unsupported portion 23 of the pipeline extending between a first elevation 40 adjacent to the ocean floor 15 and a second elevation 44 adjacent to the ocean surface 14; and (4) maintaining the pressurized condition within section 23 of the pipeline as the remainder of the pipeline is being formed and lowered to the ocean floor. A more detailed description of the present method will be easily understood following the description of the present apparatus.

Figure 2:
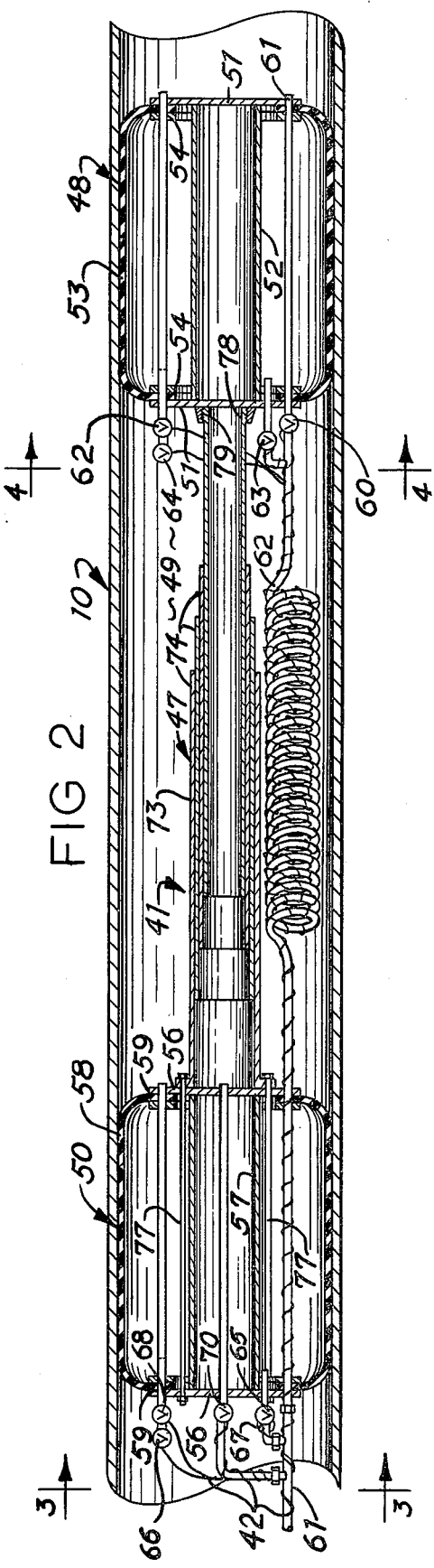
FIG. 2 is a longitudinal section taken along that part of a pipeline enclosing the apparatus of my invention.

Apparatus as shown in FIGS. 2 through 4 accomplishes the above generally described method. The apparatus is basically comprised of a plug means 41 connected by control cables 42 to a pressure supply means 43 on barge 17. The plug means 41 is inserted within the interior of the pipeline 10 and is located therein at the second elevation as shown at 44 in FIG. 1. Preferably, the elevational location of plug means 41 is somewhere in the vicinity of the stinger 28 to facilitate pressurization of the critical area or the unsupported portion 23 extending between the second elevation 44 and the first elevation 40 adjacent the ocean surface 14. A drive means 47 is included to maintain the plug means 41 at the second elevation. Drive means 47 is operatively connected to the pressure supply means 43 and operates in response to signals sent along control cable 42.

Portion 23 is sealed at the second elevation 44 by plug means 41. At the first elevaton 40, ocean water is utilized to provide an airtight seal. This is accomplished simply by allowing pipeline portion 21 resting on ocean floor 15 to fill with water to an elevation equal to the inside diameter of the pipeline (see FIG. 5). The water level is held at the elevation by air pressure as will be described later in this specification.

Certain advantages may be had by placing a valved plug 45 within pipeline end 19 to enable selective control of the amount of ocean water allowed to enter into and escape from the pipeline interior. An ordinary solenoid valve on plug 45 may be remotely operated by radio waves or through a control cable. Such a provision enables gas pressure greater than the hydraulic pressure at the first elevation to be maintained within the pipeline regardless of the elevation of pipeline end 19. Additional advantages would be realized in the procedures utilized to fasten end 19 to various fittings at an offshore location where it would be necessary to repeatedly raise and lower the pipeline from surface 14 to floor 15.

Plug means 41 may be described more specifically as including a first bladder means 48 and a second bladder means 50. Bladder means 48 and 50 are installed within the pipeline so an air space 49 exists therebetween. Also, bladder means 48 and 50 are interconnected by drive means 47 which spans the distance including air space 49.

First bladder means 48 includes a longitudinally spaced pair of plates 51 that are oriented perpendicular to the axis of the pipeline. The plates 51 are held in this orientation by a spacer tube 52 joined at its ends to plates 51. A flexible rubber bladder 53 is fastened to the plates 51 in such a manner that the air space included within may be pressurized to expand the bladder outwardly to engage and compress against the interior surface of the pipeline and thereby form an airtight seal. Bladder secton 53 may be mounted to plates 51 as shown in FIG. 2 by means of a pair of annular washers 54. Washers 54 and plates 52 sandwich the edges of the bladder section 53 to compress it therebetween and create an airtight seal within the air space included between plates 51.

The second bladder means 50 is similar to first bladder means 48 in that it includes spaced plates 56 separated by a spacer tube 57. Second bladder means 50 further includes a flexible rubber bladder section 58 connected to plates 56 through means of a pair of washers 59 in a similar arrangement as that shown for first bladder means 48.

The first and second bladder means 48 and 50 are operated through control lines 42 to selectively be inflated and deflated through a pressure tube 61 connected to a plurality of valves. Pressure valve 61 and attached electrical control cables 42 extend forwardly through the pipeline to supply means 43 such as a compressor on the barge 17. Tube 61 and cables 42 are substantially flexible and coated with a heat resistant material such as asbestos to prevent damage from heat at the welding stations 31. Tube 61 and lines 42 are sufficiently long to enable their extension through a plurality of individual pipe sections before being connected to the pressure supply source or compressor. The tube and lines 42 are preferably supplied with manually releasable fittings to enable their disconnection from the pressure source and control panel to allow further pipeline sections 12 to be threaded onto the tube 61 and lines 42. Tube 61 further includes a coiled section 62 that extends between first and second bladder means 48. Section 62 is slightly sprung so it will normally seek a retracted condition, but will extend to the same length that drive means 47 is capable of extending.

A valve 60 is connected to plates 51 on first bladder means 48. The valve 60 is selectively controlled to allow passage of air through the tube 61 to the area or interior of pipeline 10 extending between the first and second elevations. A relief valve 62 is further provided to communicate with that area and is selectively operable to relieve air pressure therefrom.

A branch line connected to pressure tube 61 includes an additional valve 63 that is controllable to allow pressurized air to enter the first bladder means 48 to inflate the bladder means against the interior of the pipeline. A relief valve 64 is also provided communicating with the interior of first bladder means 48 to selectively enable escape of air from therein and allow the bladder means to deflate.

Additional valves are provided on the second bladder means 50. A branch line extends from tube 61 to a valve 65 that is selectively operable to control inflation of the second bladder 50. Further, a relief valve 66 operatively communicates with the interior portion of bladder 50 in order that pressurized air may be relieved from within the bladder to result in its deflation. The branch lines are disconnectable from the valves to enable selective removal of the second bladder from the remainder of the plug assembly.

An additional valve 67 is provided on second bladder 50 that is connected by a branch line to tube 61 to receive air therefrom and direct it into the area between the first and second bladders. A relief valve 68 communicates with the air space between the two bladder means in order to relieve air pressure from that space to the inner portions of the pipeline 10 forward of the second bladder means 50. An additional valve 70 is provided to facilitate operation of the drive means 47 as will now be discussed in greater detail.

Drive means 47 is comprised of an elongated extensible ram cylinder 73. Cylinder 73 includes a plurality of telescoping sections 74 that operate under air pressure to move between an extended and retracted condition. Air cylinder 73 as shown in FIG. 2 is in a somewhat retracted condition. The extended condition is diagrammatically illustrated in FIGS. 6 through 8 Valve 70 is a "4-way" valve that is operable to direct pressurized air into the cylinder to extend the telescoping section 74 or withdraw air from the cylinder to retract sections 74 as shown in FIGS. 2, 5, 9 and 10.

The ram cylinder 73 is attached to bladder means 50 by mounting bolts 77 that extend forwardly, completely through the second bladder 50 with their headed ends at the forward portion of the bladder. The mounting bolts may be selectively loosened from the cylinder through bladder 50 in order to disengage bladder 50 from cylinder 73 and first bladder means 48. Additionally, cylinder 73 is provided with a threaded end 78 that is threadedly received within a female threaded flange 79 on first bladder means 48. Thus, the second bladder means 50 may be selectively removed from one end of the cylinder to allow access to the cylinder and the cylinder may then be selectively disconnected from the first bladder means 48 to leave only bladder means 48 secured within the pipeline. This construction provides a certain advantage when utilizing the plug assembly during the final stages of laying a pipeline.

From the above detailed description of my apparatus, the present method may now be easily understood.

To initiate formation of the elongated pipeline, the barge 17 is brought alongside or adjacent to the area whereat the pipeline is desired to be connected. At this point, assembly of the pipeline is begun with the pipe sections 12 being connected in an end-to-end coaxial relationship as the barge moves forwardly. The forward motion of the barge coincides with the production of the pipeline so that the pipeline end 19 remains stationary relative to the ocean floor. The pipeline end 19 is held adjacent the ocean surface 14 until a sufficient amount of pipeline has been constructed to extend from the ocean surface to the ocean floor 15 and with a small portion 21 resting on the ocean floor.

During initial lowering of pipeline end 19 to the ocean floor, gas pressure may be maintained at a sufficient level within the underwater portion of the pipeline to prevent water from entering into open end 19 as it is lowered toward the ocean floor. If a valved plug 45 is utilized, the entire length of pipeline from barge 17 to end 19 may be pressurized continuously regardless of the elevational position of end 19, i.e., whether or not it is held above or below the ocean surface 14. Once lowered, the pipeline portion 21 may then become filled with ocean water. The ocean water within pipeline 12 creates an airtight seal adjacent the ocean floor (elevation 40) to operate against the pressurized air directed into the pipeline section 23 by pressure supply means 43. The second elevation or area along the inside of pipeline 10 adjacent ocean surface 14 is sealed by the plug means 41.

Pressurized air is directed through the plug means 41 and into the pipeline portion 23 to pressurize that portion to a level sufficient to maintain the water level within the pipeline portion 21 resting on the ocean floor. For example, the air pressure required within the pipeline to maintain a water level at the first elevation under 250 feet of water, is 110 p.s.i. This pressure, working against the plug means on one end of portion 23 to equalize the hydraulic pressure at the remaining end of portion 23, creates a sufficient tension along the pipeline section 23 to prevent it from buckling while being lowered to the ocean floor. Indeed, the amount of tension supplied by gas pressure of this magnitude is substantially greater than that required to prevent buckling. Further, this pressure is located internally within pipe section 23 to create internal tension along pipeline portion 23 that is independent of the barge 17. Therefore, movement of the barge whether vertical or horizontal will not affect the gas and, therefore, tension along that section may be continuously maintained.

In order to maintain the tension along unsupported section 23, plug means 41 must be selectively moved along the inside of pipeline 10 in order to maintain its position at the second elevation. This is accomplished by alternately inflating and deflating the first and second bladder means and correspondingly operating the drive means 47 to contract and extend.

This operation is illustrated by the diagrammatic views shown in FIGS. 5 through 10. A single cycle is shown in the drawings, it being understood that this cycle is repeated continuously so long as the pipeline is being formed and lowered to the ocean floor.

In FIG. 5, the plug means 41 is shown located within the pipeline 10 at the second elevation 44 with the first bladder means 48 inflated to create an airtight seal against air pressure within portion 23. The second bladder means 50 is shown in a deflated condition in FIG. 5. As the pipeline is progressively formed, the first bladder means 48 moves along with the pipeline relative to barge 17 toward the ocean floor 15. After a prescribed length of pipeline has been played out, ram cylinder 73 is actuated to extend, moving the deflated second bladder means 50 forwardly against resistance offered by the inflated stationary first bladder means 48 (FIG. 6). Such movement brings the second bladder means 50 forwardly within pipeline section 23 to position adjacent to the second elevation 44. The next step then is to inflate the second bladder means 50 and produce another airtight seal forward of first bladder means 48 (FIG. 7).

The second bladder means 50 is shown in an inflated condition in FIG. 7 with the ram cylinder 73 in an extended position between bladder means 48 and 50. Once an airtight seal is achieved by second bladder means 50, valve 67 is opened to direct pressurized air into area 49 between bladder means 48 and 50. Air pressure is thereby raised in that area 49 to a level equal to the pressure within the pipeline section 23. Once this pressure level is reached, first bladder means 48 is deflated (FIG. 8). Ram cylinder 73 is then operated through valve 70 to contract, moving the first bladder means 48 toward the second bladder means 50 (FIG. 9).

When ram cylinder 73 is fully contracted as shown in FIG. 9, the first bladder means 48 may be reinflated (FIG. 10) to again create an airtight seal at the second elevation. To complete the cycle and arrive at the condition at FIG. 5, the second bladder means is deflated to enable its longitudinal movement within pipeline 10 relative to the inflated first baffle means 48. This "inchworm" progression of movement within the pipeline serves to maintain an airtight seal at the desired elevation along the pipeline while further maintaining a constant gas pressure in pipeline portion 23.

It should be understood that, although it is most preferable that an airtight seal be maintained at the second elevation as described, other locations may also be selected whereat a seal may be provided as the pipeline is being formed.

Once the complete length of pipeline is formed, the second bladder means and ram cylinder may be selectively removed from engagement with the first bladder means to facilitate further operations such as the fitting of angled pipe sections in order to bring the pipeline vertically to a second, distant facility (not shown). In doing so, the relatively compact bladder means 48 may be easily retracted through such angular fittings without binding, whereas the total contracted length of the plug means 41 would ordinarily bind within the pipeline.

It should also be understood that the plug means can be selectively operated to move in either direction within the pipe by simply reversing the operational cycle as described above. This condition may be utilized when pipe repairs are required or when the pipeline must be taken up for other reasons.

By providing the pipeline end 19 with a selectively operable valved plug 45, I am able to maintain a constant tension within the pipeline regardless of the elevational position of the remaining pipe end 20. Therefore, the remaining pipe end 20 may be lowered to the ocean floor at a substantially equal elevation to that of the first pipe end 19, without releasing air pressure from within the entire pipeline length. This feature is further advantageous in that the pipeline end 19 may also be treated similarly to remaining end 20 when being connected or fitted to other angled pipeline sections.

The above description is given only by way of example, it being understood that various changes and modifications may be made therein without departing from the scope of my invention. It is therefore intended that only the following claims be taken as restrictions upon the scope of my invention.

What I claim is:

1. A process for laying an elongated thin walled large diameter pipeline on the ocean floor, comprising the steps of:

assembling the pipeline adjacent the ocean surface;

lowering a segment of the pipeline from the ocean surface to the ocean floor to place a portion of the segment of the pipeline supported on the ocean floor with an unsupported portion of the segment extending upward from the ocean floor;

filling at least a portion of the segment portion supported on the ocean floor with sufficient liquid to provide a gastight liquid seal within the pipeline and to minimize lateral movement of the pipeline due to ocean currents;

pressurizing the interior of the unsupported portion of the segment of the pipeline with a gas to produce a longitudinal tension along the unsupported portion of sufficient magnitude to prevent buckling of the unsupported portion as it is being lowered to the ocean floor; and progressively lowering the pressurized unsupported segment to the ocean floor.

2. The process as defined in claim 1 further comprising the step of:

controlling the pressure of the gas within the unsupported portion as it is being lowered to the ocean floor to prevent the liquid in the supported portion from moving into the unsupported portion.

3. The process as recited in claim 1 further comprising the step of:

providing a gastight seal within the pipeline adjacent the ocean surface.

4. The process as defined in claim 3 wherein the step of assembling the pipeline is accomplished by fastening individual pipeline sections end to end at the ocean surface and progressively paying out and lowering the fastened pipeline sections to the ocean floor.

5. The process as set out in claim 4 wherein the step of providing the gastight seal adjacent the ocean surface is accomplished by progressively moving the seal within the pipeline as the pipeline is progressively payed out and lowered to the ocean floor.

6. The process as set out in claim 5 wherein the step of providing a gastight seal within the pipeline adjacent the ocean surface is accomplished by:

locating a first and a second inflatable bladder means within the pipeline, said first and second bladder means being interconnected by an extensible and retractable drive means for moving the bladder means together and apart relative to one another within the pipeline; and operating the first and second bladder means and drive means in prescribed cycles to maintain a gastight seal within the pipeline adjacent the ocean surface by alternately moving one bladder means after the other is inflated to form a gastight seal within the pipeline.

7. The process as recited in claim 6 wherein a single prescribed cycle is comprised of the steps of:

inflating the first bladder means against the pipeline interior to provide a gastight seal;

deflating the second bladder means within the pipeline;

extending the drive means to move the deflated second bladder means away from the first bladder means in a direction along the pipeline away from the ocean floor;

inflating the second bladder means against the pipeline interior to provide a gastight seal;

deflating the first bladder means;

retracting the drive means to move the deflated first bladder means toward the inflated second bladder; and reinflating the first bladder means against the pipeline interior to provide another gastight seal.

8. Apparatus for pressurizing the interior of an unsupported segment of an elongated pipeline as it is being laid on the ocean floor to prevent the unsupported segment from buckling, comprising:

a first inflatable bladder means expandable to a diameter corresponding to the inside diameter of said pipeline for providing a gastight seal in the pipeline;

a second inflatable bladder means expandable to a diameter corresponding to the inside diameter of said pipeline for providing a gastight seal in the pipeline;

a ram cylinder connected at one end to the first bladder means and at a remaining end to the second bladder means for moving one bladder means with respect to the other;

fluid control means operatively connected to each bladder and the ram cylinder means for sequentially inflating and deflating the bladder means and operating the ram cylinder to progressively move the bladder means in an "inchworm" fashion along the pipeline while maintaining a gastight seal therein.

9. The apparatus as defined in claim 8 wherein the ram cylinder has a plurality of telescoping sections to enable the ram cylinder to be extended and contracted in response to fluid pressure to move one bladder means with respect to the other.

* * * * *